United States Patent
Tsuji

(10) Patent No.: US 7,188,603 B1
(45) Date of Patent: Mar. 13, 2007

(54) FUEL INJECTION CONTROL DEVICE AND CONTROL METHOD FOR INTERNAL COMBUSTION ENGINE AND RECORDING MEDIUM RECORDED WITH PROGRAM REALIZING CONTROL METHOD

(75) Inventor: Hiroaki Tsuji, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/515,867

(22) Filed: Sep. 6, 2006

(30) Foreign Application Priority Data

Sep. 15, 2005 (JP) .............................. 2005-268459

(51) Int. Cl.
*F02M 51/00* (2006.01)

(52) U.S. Cl. ...................................... 123/326; 123/492

(58) Field of Classification Search ................. 123/326, 123/492, 478, 479
See application file for complete search history.

(56) References Cited

U.S. PATENT DOCUMENTS

| | | | | |
|---|---|---|---|---|
| 4,527,521 A | * | 7/1985 | Hasegawa et al. | 123/326 |
| 4,667,631 A | * | 5/1987 | Kinugasa | 123/492 |
| 4,753,210 A | * | 6/1988 | Fujimoto et al. | 123/492 |
| 4,805,579 A | * | 2/1989 | Toshimitsu et al. | 123/492 |
| 5,065,716 A | * | 11/1991 | Nakagawa et al. | 123/326 |
| 6,044,824 A | * | 4/2000 | Mamiya et al. | 123/492 |

FOREIGN PATENT DOCUMENTS

| | | |
|---|---|---|
| JP | A 64-24141 | 1/1989 |
| JP | A 8-158920 | 6/1996 |
| JP | B 2600694 | 1/1997 |
| JP | A 2001-329891 | 11/2001 |

* cited by examiner

*Primary Examiner*—Erick Solis
(74) *Attorney, Agent, or Firm*—Oliff & Berridge, PLC

(57) ABSTRACT

From execution of fuel cut until restoration therefrom in response to a F/C flag being set, an ECU senses an intake air amount Q and engine speed NE, calculates the charging efficiency based on Q and NE, and calculates a basic injection amount TAU_B based on the charging efficiency. When the F/C flag is reset, the ECU calculates asynchronous injection requested amount TAU_REQ based on emission request, calculates upper guard injection amount ASY_MAX based on TAU_B, inserts ASY_MAX into asynchronous injection amount TAU_ASY when TAU_REQ is larger than ASY_MAX and inserts TAU_REQ into asynchronous injection amount TAU_ASY when TAU_REQ is equal to or below ASY_MAX.

16 Claims, 4 Drawing Sheets

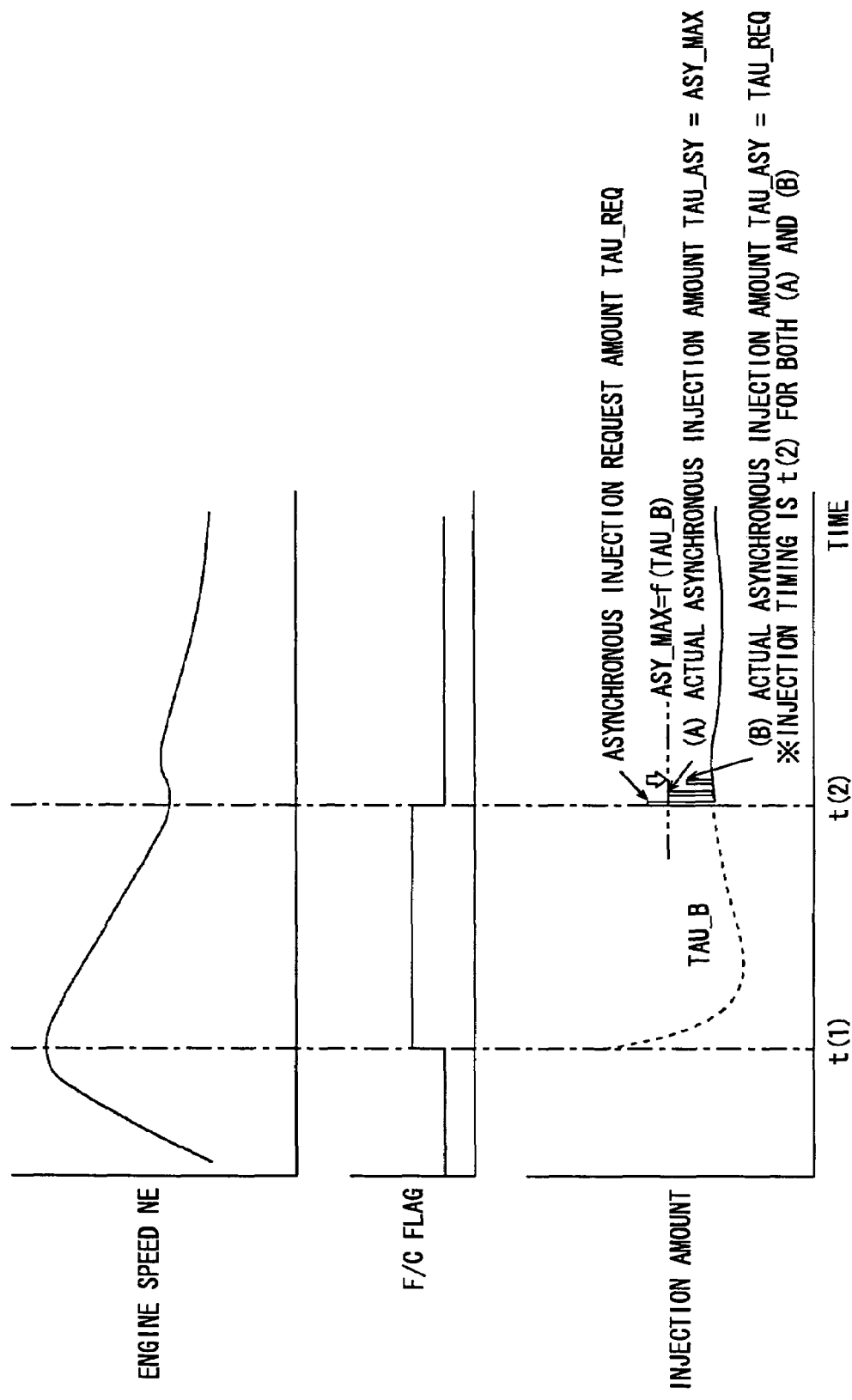

FUEL INJECTION CONTROL DEVICE AND CONTROL METHOD FOR INTERNAL COMBUSTION ENGINE AND RECORDING MEDIUM RECORDED WITH PROGRAM REALIZING CONTROL METHOD

This nonprovisional application is based on Japanese Patent Application No. 2005-268459 with the Japan Patent Office on Sep. 15, 2005, the entire contents of which are hereby incorporated by reference.

BACKGROUND OF THE INVENTION

1. Field of the Invention

The present invention relates to fuel injection control for an internal combustion engine, particularly asynchronous injection control at the time of restoration from a fuel cut mode.

2. Description of the Background Art

When a spark ignition type engine is shifted from a steady operation state to an accelerating operation state, fuel injection that is not in synchronization with the engine revolution for the purpose of increasing fuel (hereinafter, referred to as asynchronous injection) is conducted aside from fuel injection at every engine revolution (hereinafter, referred to as synchronous injection). For example, in the case of a multicylinder engine mounted on a vehicle, fuel is injected in synchronization into the intake port by an injector from the later stage of the exhaust stroke to the intake stroke for each cylinder in a steady operation state. When an action is made by the driver of the vehicle to open the throttle valve, asynchronous injection is effected immediately for all the cylinders. Accordingly, the fuel supply to all the cylinders is increased without delay corresponding to the increase of the intake air to avoid dilution of the air-fuel mixture and to avoid degradation in the vehicle acceleration response. Thus, the drivability can be improved.

In such asynchronous injection, a constant amount of fuel is injected by sensing the accelerating operation state, irrespective of the crank angle, to avoid degradation in the acceleration response. However, there is the problem that deviation from the stoichiometric air-fuel ratio may occur as the number of times of asynchronous injection increases since the stoichiometric air-fuel ratio is not taken into account as in synchronous injection. Japanese Patent Laying-Open No. 08-158920 discloses a correcting control device during the transition period of electronic fuel injection that can maintain the stoichiometric air-fuel ratio even in asynchronous injection. This correcting control device for the transition period of electronic fuel injection estimates the intake pipe pressure of a preread crank angle from the time of calculation to the average timing of each cylinder taking in fuel based on pressure changes in the past in the intake pipe when fuel injection is to be effected at one time for all the cylinders. The correcting control device accommodates synchronous injection effecting fuel injection of one cycle taking into consideration the stoichiometric air-fuel ratio based on the estimated pressure, and asynchronous fuel injection effecting injection of fuel that runs short in synchronous injection at the time of abrupt acceleration. The amount of fuel injection for the asynchronous fuel injection is obtained taking into consideration the stoichiometric air-fuel ratio by estimating the intake pipe pressure, likewise synchronous injection. The maximum value of the amount of fuel to be injected in one cycle is limited in synchronous injection and asynchronous injection.

In accordance with this correcting control device, the fuel injection amount in asynchronous fuel injection is obtained taking into account the stoichiometric air-fuel ratio by estimating the intake pipe pressure, likewise synchronous injection, so that deviation from the stoichiometric air-fuel ratio, even when the asynchronous fuel injection amount increases, can be suppressed. Further, by limiting the maximum value of the amount of fuel to be injected in one cycle in synchronous injection and asynchronous injection, excessive correction can be suppressed.

The exhaust system of an engine is generally provided with a catalytic converter to purify specific components in the exhaust gas. A three-way catalytic converter is used extensively for such a catalytic converter to oxidize carbon monoxide (CO) and unburned hydrocarbon (HC) and to reduce nitrogen oxide ($NO_x$), which are the specific three components in exhaust gas, for conversion into carbon dioxide ($CO_2$), water vapor ($H_2O$), and nitrogen ($N_2$), respectively.

The purifying property by the three-way catalytic converter depends upon the air-fuel ratio of the air-fuel mixture formed in the combustion chamber. The three-way catalytic converter functions most effectively when the air-fuel ratio is in the vicinity of the stoichiometric air-fuel ratio. This is due to the fact that, if the air-fuel ratio is lean and the amount of oxygen in the exhaust gas is large, oxidation becomes active whereas reduction becomes inactive, and if the air-fuel ratio is rich and the amount of oxygen in the exhaust gas is small, reduction becomes active whereas oxidation becomes inactive, such that all the three components set forth above cannot be purified favorably. Therefore, an engine with a three-way catalytic converter has an output linear type oxygen sensor provided at the exhaust manifold such that the air-fuel mixture in the combustion chamber is feedback-controlled to the stoichiometric air-fuel ratio based on the oxygen concentration measured by the oxygen sensor. In other words, when the air-fuel ratio is lean and the amount of oxygen in the exhaust gas is large, the reduction action becomes inactive, which means that the action of reducing nitrogen oxide ($NO_x$) is deteriorated to degrade the $NO_x$ purifying function.

The vehicle employs the control to suppress fuel supply during deceleration in order to improve the fuel economy, i.e. fuel-cut control. This fuel cut control aims to improve the fuel economy by reducing fuel supply to the engine as much as possible in a range that does not spoil the running performance and riding comfort. In general, fuel supply is suppressed when the engine speed falls within a predetermined range (equal to or higher than the fuel-cut speed) during deceleration in which the engine takes an idling state. Specifically, when the throttle valve is closed during running and the engine speed is equal to or higher than the fuel cut speed, supply of fuel is ceased. When the engine speed is reduced to arrive at the restoration speed that defines the lower limit of the range (fuel cut restoration speed), fuel supply is resumed.

Since fuel injection is suppressed during fuel-cut control, the air-fuel ratio is rendered lean, and the $NO_x$ purifying function is degraded. If fuel is injected upon restoration from the fuel-cut state, the $NO_x$ cannot be purified sufficiently since the $NO_x$ purifying function by the three-way catalytic converter is degraded. Therefore, the asynchronous injection based on emission request set forth above is executed.

If the fuel injection amount in asynchronous injection is excessive, the air-fuel ratio will become too rich to cause backfire. If the fuel injection amount is too low, a sufficiently rich atmosphere cannot be achieved in the three-way catalytic converter, leading to the problem that the $NO_x$ purifying function cannot be improved.

These problems, however, are not recognized in the aforementioned Japanese Patent Laying-Open No. 08-158920. Although the control device disclosed in this publication restricts the amount of fuel injection per cycle in order to suppress excessive correction, the problems set forth above are not addressed.

SUMMARY OF THE INVENTION

In view of the foregoing, an object of the present invention is to provide a fuel injection control device for an internal combustion engine that can execute asynchronous injection appropriately at the time of restoration from a fuel-cut mode.

When the state of the vehicle satisfies a predetermined condition, the control device of the present invention controls fuel injection of the internal combustion engine executing fuel cut that suppresses fuel supply to the internal combustion engine. The control device is adapted to control the internal combustion engine such that asynchronous injection is executed when execution of fuel cut is ceased, set the upper limit value of the fuel injection amount in a mode of asynchronous injection, calculate the requested amount of injection for asynchronous injection in order to improve the function of an exhaust purify device provided at the internal combustion engine, and regulate the fuel injection amount for asynchronous injection to the upper limit value when the requested amount of injection is higher than the upper limit value.

In accordance with the present invention, asynchronous injection is effected to inject fuel to all the plurality of cylinders at one time when the atmosphere in the three-way catalytic converter was lean during fuel cut and execution of fuel cut is ceased (restoration from fuel cut). In order to render the atmosphere in the three-way catalytic converter as rich as possible to improve the $NO_x$ purifying function, the fuel injection amount in asynchronous injection is desirably high. If, however, this fuel injection amount is excessive, backfire may occur to melt and deteriorate the catalyst. Therefore, when the requested amount of injection is higher than the upper limit value, the fuel injection amount in asynchronous injection is regulated to the upper limit value. Accordingly, asynchronous injection based on emission request can be conducted while avoiding the problem of backfire and the like as well as improving the $NO_x$ purifying function of the three-way catalytic converter at the time of restoration from fuel cut. As a result, a fuel injection control device for an internal combustion engine that can execute asynchronous injection appropriately at the restoration from fuel cut can be provided.

Preferably, the fuel injection control device sets the upper limit value based on the basic injection amount by synchronous injection.

In the present invention, the basic injection amount in a fuel cut mode is calculated and the upper limit value in asynchronous injection is set corresponding to the basic injection amount. Therefore, the upper limit value can be set according to the operation state of the internal combustion engine and the event of unnecessarily setting the upper limit value can be avoided.

Further preferably, the fuel injection control device sets the upper limit value relatively higher in the region where the basic injection amount is large as compared to the region where the basic injection amount is small.

In the present invention, a high basic injection amount corresponds to a region of high charging efficiency. In such a region, the $NO_x$ purifying function of the three-way catalytic converter is to be improved than the problem of backfire. Therefore, a relatively high upper limit value is set to achieve sufficient asynchronous injection.

Further preferably, fuel cut is executed after racing, i.e. after increasing the engine speed in a non-load state.

In accordance with the present invention, fuel cut is executed after racing to avoid the problem of backfire that is particularly noticeable at the time of restoration from fuel cut.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a timing chart representing an engine state under control of an engine ECU qualified as a control device according to an embodiment of the present invention.

DESCRIPTION OF THE PREFERRED EMBODIMENTS

Figure 1:
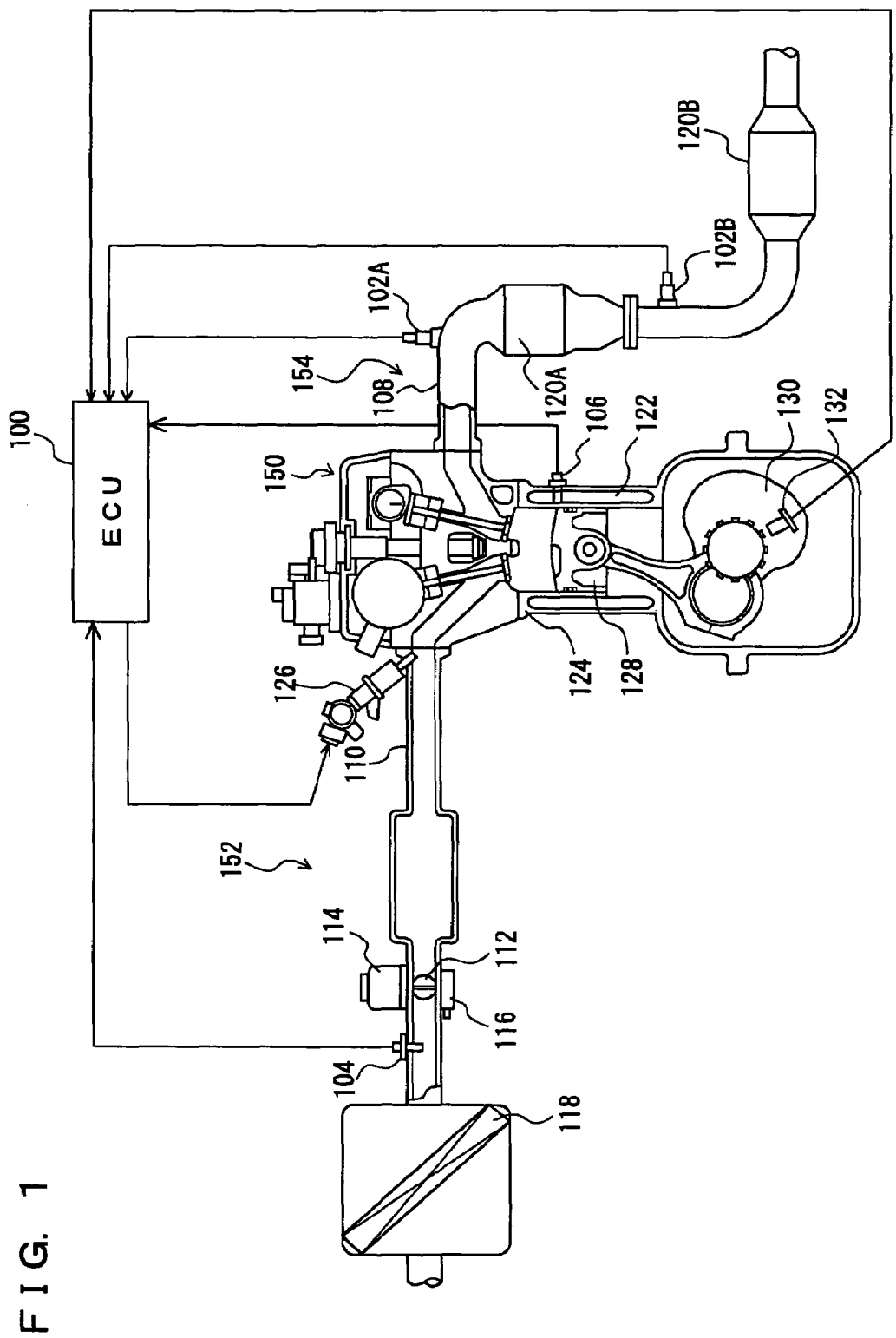
FIG. 1 represents a configuration of an engine in a vehicle to which a fuel injection control device according to an embodiment of the present invention is incorporated.

Embodiments of the present invention will be described hereinafter with reference to the drawings. The same components have the same reference characters allotted, and their designation and function are also identical. Therefore, detailed description thereof will not be repeated.

Referring to FIG. 1, a vehicle to which a fuel injection control device for an internal combustion engine according to the present embodiment is incorporated includes an engine 150, an intake system 152, an exhaust system 154, and an ECU (Electronic Control Unit) 100.

Intake system 152 includes an intake manifold 110, an air cleaner 118, an air flow meter 104, a throttle motor 114, a throttle valve 112, and a throttle position sensor 116.

The air taken in through air cleaner 118 passes through intake manifold 110 to flow to engine 150. Throttle valve 112 is provided in the course of intake manifold 110. Throttle valve 112 opens/closes by an operation of throttle motor 114. The opening of throttle valve 112 can be sensed by throttle position sensor 116. At the intake manifold between air cleaner 118 and throttle valve 112, air flow meter 104 is provided to sense the amount of air taken in. Air flow meter 104 transmits an intake amount signal representing the amount of intake air Q to ECU 100.

Engine 150 includes a coolant pipe 122, a cylinder block 124, an injector 126, a piston 128, a crankshaft 130, a coolant temperature sensor 106, and a crank position sensor 132.

A specific number of cylinders are provided in a cylinder block 124, and a piston 128 is provided in each of the plurality of cylinders. A mixture of the fuel injected from injector 126 and the intake air is introduced through intake manifold 110 into the combustion chamber located above piston 128. The air-fuel mixture is ignited by a spark plug (not shown) to burn. By this burning, piston 128 is pushed down. At this stage, the up-and-down motion of piston 128 is converted into a rotation motion of crankshaft 130 via the crank mechanism. The engine speed NE of engine 150 is detected by ECU 100 based on a signal sensed by crank position sensor 132.

Water coolant pipe 122 is provided in cylinder block 124. Coolant circulates through coolant pipe 122 by the operation of a water pump (not shown). The coolant in coolant pipe 122 flows to a radiator (not shown) connected to coolant pipe 122 to be derived of heat by a cooling fan (not shown). Coolant temperature sensor 106 is provided above the channel of coolant pipe 122 to sense the temperature of the coolant in coolant pipe 122. Coolant temperature sensor 106 transmits a coolant temperature signal corresponding to the sensed coolant temperature to ECU 100.

Exhaust system 154 includes an exhaust pipe 108, a first air-fuel ratio sensor 102A, a second air-fuel ratio sensor 102B, a first three-way catalytic converter 120A, and a second three-way catalytic converter 120B. First air-fuel ratio sensor 102A is provided at the upstream side of first three-way catalytic converter 120A. Second air-fuel ratio sensor 102B is provided at the downstream side of first three-way catalytic converter 120A (upstream side of second three-way catalytic converter 120B). It is to be noted that only one three-way catalytic converter may be provided instead.

Exhaust pipe 108 connected to the exhaust side of engine 150 is connected with first and second three-way catalytic converters 120A and 120B. The exhaust gas generated by the burning of air-fuel mixture in the combustion chamber of engine 150 first flows to first three-way catalytic converter 120A. The HC and CO included in the exhaust gas flowing into first three-way catalytic converter 120A are oxidized at first three-way catalytic converter 120A. The $NO_x$ included in the exhaust gas flowing to first three-way catalytic converter 120A is reduced at first three-way catalytic converter 120A. First three-way catalytic converter 120A is located in the proximity of engine 150 to be rapidly increased in temperature even in a cold start mode of engine 150 to exhibit the catalytic function.

The exhaust gas is then delivered from first three-way catalytic converter 120A to second three-way catalytic converter 120B for the purpose of purifying $NO_x$. First and second three-way catalytic converters 120A and 102B basically have the same configuration and function.

A first oxygen sensor 102A provided at the upstream side of first three-way catalytic converter 120A and a second oxygen sensor 102B provided at the downstream side of first three-way catalytic converter 120A and the upstream side of second three-way catalytic converter 120B sense the concentration of oxygen included in the exhaust gas that passes through three-way catalytic converter 120A or three-way catalytic converter 120B. By sensing the oxygen concentration, the ratio of fuel to air included in the exhaust gas, i.e. air-fuel ratio, can be identified.

First and second air-fuel ratio sensors 102A and 102B generate current corresponding to the oxygen concentration in the exhaust gas. This current is converted into voltage, for example, to be applied to ECU 100. Thus, the air-fuel ratio of exhaust gas at the upstream of first three-way catalytic converter 120A can be identified by the output signal of first air-fuel ratio sensor 102A. The air-fuel ratio of exhaust gas at the upstream of second three-way catalytic converter 120B can be identified by the output signal of second air-fuel ratio sensor 102B. First and second air-fuel sensors 102A and 102B generate, for example, a voltage of approximately 0.1V and a voltage of approximately 0.9V when the air-fuel ratio is lean and rich, respectively. Air-fuel ratio control is effected by ECU 100 based on the comparison between a value converted into the air-fuel ratio according to the generated voltage value and the air-fuel ratio threshold value.

First and second three-way catalytic converters 120A and 120B function to oxidize HC and CO and reduce $NO_x$ when the air-fuel ratio is substantially equivalent to the stoichiometric ratio, i.e. function to purify HC, CO and $NO_x$ at the same time. First and second three-way catalytic converters 120A and 120B exhibit active oxidization and inactive reduction when the air-fuel ratio is lean and the amount of oxygen in the exhaust gas is high, and exhibit active reduction and inactive oxidation when the air-fuel ratio is rich and the amount of oxygen in the exhaust gas is low. All the aforementioned three components cannot be purified favorably by the three-way catalytic converters. When the air-fuel ratio is lean and the amount of oxygen in the exhaust gas is high, reduction becomes inactive, whereby the action of reducing nitrogen oxide ($NO_x$) is reduced to degrade the $NO_x$ purifying function.

Engine 150 employs the control to suppress fuel supply during deceleration in order to improve the fuel economy, i.e. the so-called fuel-cut control. Fuel supply is suppressed when the engine speed falls within a predetermined range (at least the fuel cut speed) during deceleration in which engine 150 is idle. Specifically, when the throttle valve 112 is closed during running and the engine speed is equal to or above the fuel cut speed, fuel supply is ceased. When the engine speed is reduced to arrive at the restoration speed that defines the lower limit of the range (fuel cut restoration speed), fuel supply is resumed. This restoration speed is set to a value that does not cause engine stall and that can maintain steady revolution of engine 150. When the temperature of the engine coolant sensed by coolant temperature sensor 106 is low, the fuel cut speed and fuel cut restoration speed are set at high values.

ECU 100 qualified as a fuel injection control device for an internal combustion engine according to the present invention executes asynchronous injection (outputs an injection instruction signal to injector 126 of all cylinders) to render the atmosphere in three-way catalytic converters 120A and 120B rich at the time of restoration from fuel cut. Accordingly, the atmosphere of first and second three-way catalytic converters 120A and 120B, lean in a fuel cut mode, can be rendered rich at the time of restoration to purify $NO_x$. If the amount of fuel injection in this asynchronous injection is excessive, backfire may occur to melt and deteriorate the catalyst. Therefore, ECU 100 provides an upper limit guard for the requested amount by emission request with respect to the fuel injection amount in asynchronous injection to suppress the occurrence of backfire.

Figure 2:
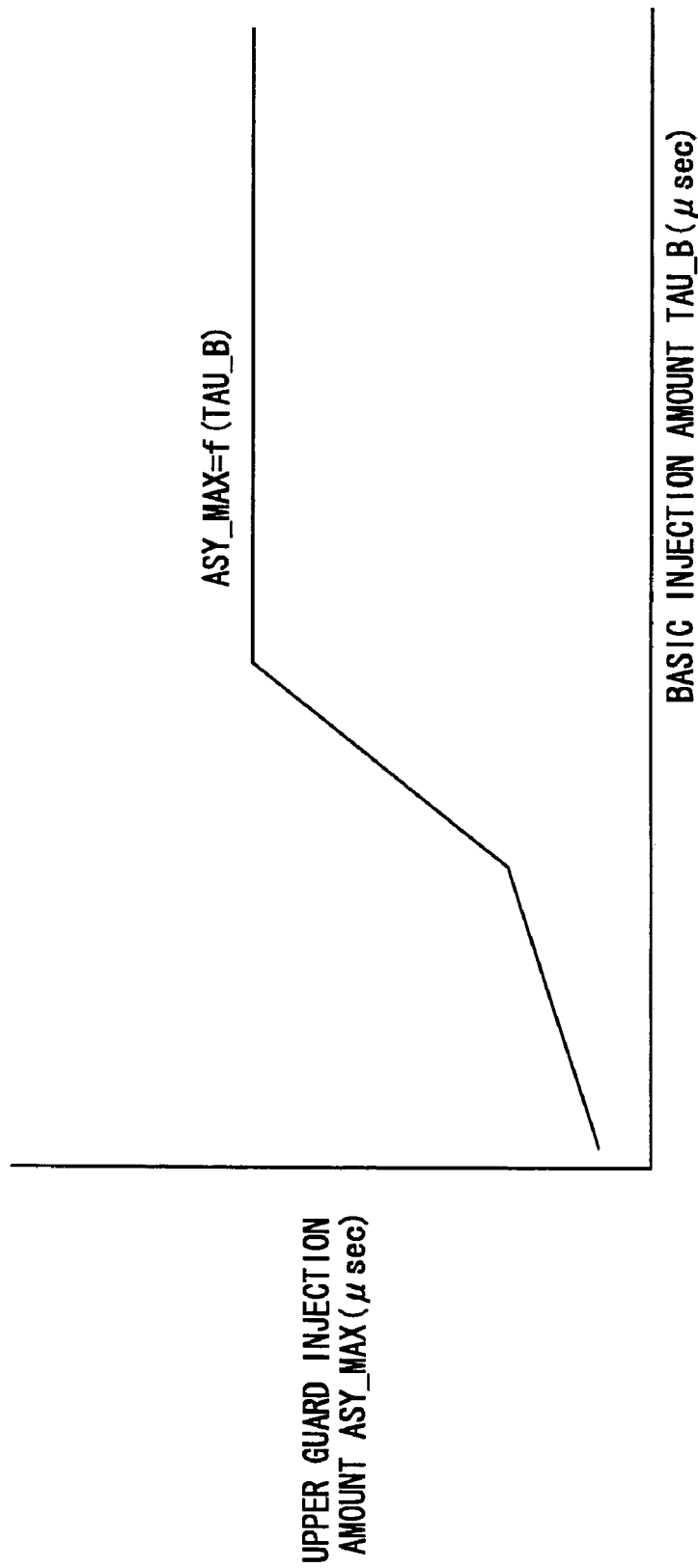
FIG. 2 represents the relationship between the basic injection amount and upper limit guard injection amount stored in an engine ECU qualified as a fuel injection control device according to an embodiment of the present invention.

The upper limit guard injection amount ASY_MAX (μsec) in asynchronous injection at the time of restoration from fuel cut will be described with reference to FIG. 2. FIG. 2 represents the relationship of upper limit guard injection amount ASY_MAX (μsec) with respect to basic injection amount TAU_B (μsec) from injector 126. ASY_MAX (μsec)=f(TAU_B) is established with a function f.

It is appreciated from FIG. 2 that upper limit guard injection amount ASY_MAX (μsec) is low when basic injection amount TAU_B (μsec) is low, and upper limit guard injection amount ASY_MAX (μsec) takes a constant value when basic injection amount TAU_B (μsec) exceeds a predetermined value.

Basic injection amount TAU_B (μsec) that is the fuel injection amount for synchronous injection is related to the charging efficiency of engine 150 (the ratio of the amount of air actually drawn into the cylinder to the amount of air that is to be drawn in theoretically, and calculated based on engine speed NE and intake air amount Q). When the charging efficiency is low, basic injection amount TAU_B (μsec) is small; when the charging efficiency is high, basic injection amount TAU_B (μsec) is large. In the case where engine 150 is in a normal operation state, the charging efficiency is high and low when the opening of throttle valve 112 is large and small, respectively.

Thus, the region of low basic injection amount TAU_B (μsec) shown in FIG. 2 corresponds to a region of low charging efficiency. In this region, the melting and deterioration of the catalyst caused by backfire can be prevented, so that a certain level of the $NO_x$ purifying function can be exhibited. In contrast, the region shown in FIG. 2 where basic injection amount TAU_B (μsec) is high corresponds to a region where the charging efficiency is high. In such a region, the $NO_x$ purifying function by first and second three-way catalytic converters 120A and 120B can be exhibited sufficiently. In view of the foregoing, the upper limit guard injection amount ASY_MAX (μsec) at the region where basic injection amount TAU_B (μsec) is low is small (guarded extensively), whereas the upper limit guard injection amount ASY_MAX (μsec) at the region where basic injection amount TAU_B (μsec) is high is large (not guarded extensively).

The relationship between basic injection amount TAU_B (μsec) and upper guard injection amount ASY_MAX (μsec) shown in FIG. 2 is only a way of example, and the present invention is not limited to the relationship shown in FIG. 2.

Figure 3:
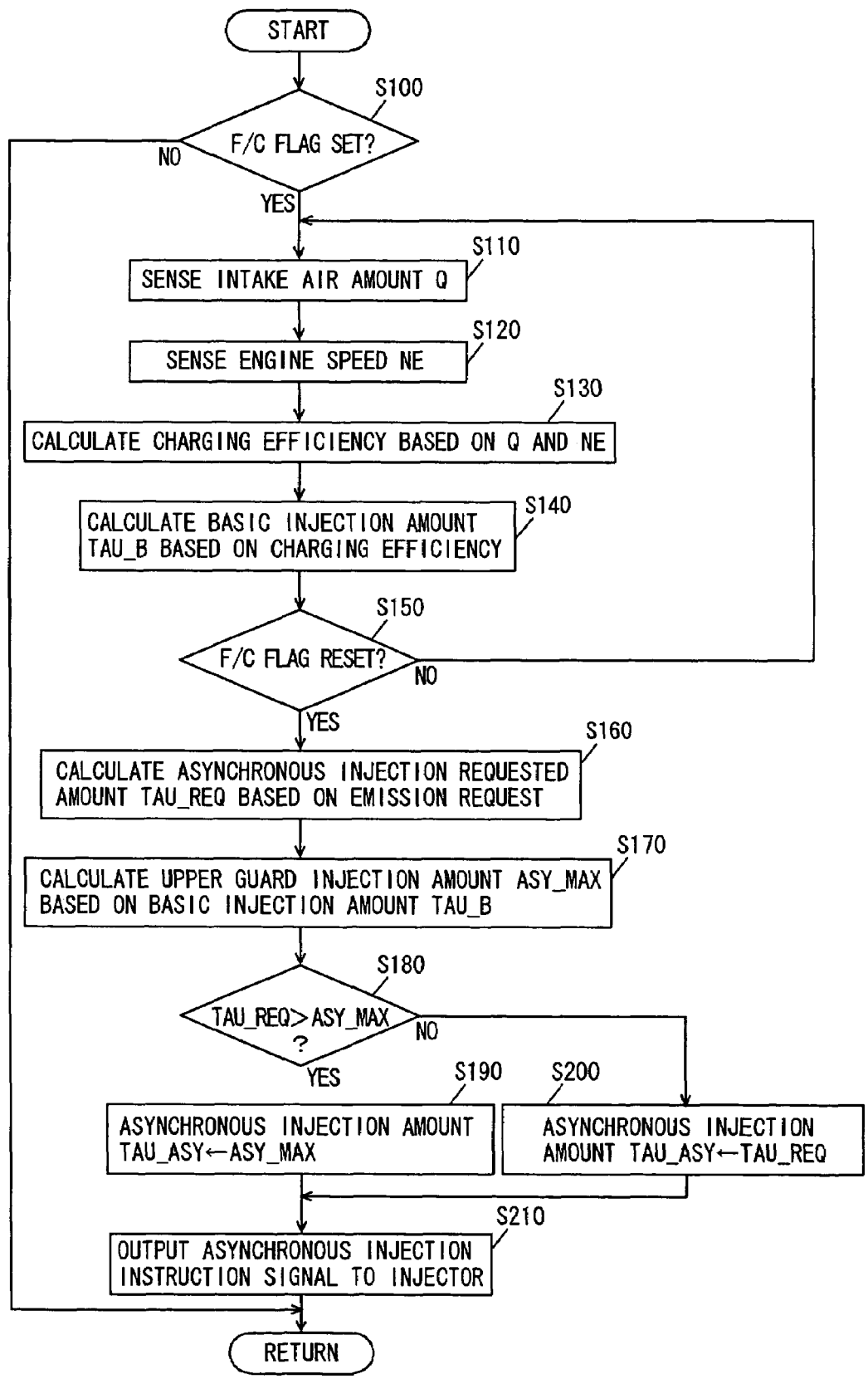
FIG. 3 is a flow chart of a control program executed by an engine ECU qualified as a control device according to an embodiment of the present invention.

The configuration of the control program executed at ECU 100 qualified as a fuel injection control device according to the present embodiment will be described hereinafter with reference to FIG. 3. This program is executed repeatedly at a predetermined cycle time (for example, 8 msec).

At step (hereinafter, step abbreviated at S) 100, ECU 100 determines whether a F/C (fuel cut) flag is set or not. This F/C flag is set and reset when the fuel cut start condition by another program executed at ECU 100 is satisfied and not satisfied, respectively. When the F/C flag is set (YES at S100), control proceeds to S110, otherwise (NO at S100), the process ends.

At S110, ECU 100 senses the intake air amount Q based on a signal from air flow meter 104. At S120, ECU 100 senses engine speed NE based on a signal from crank position sensor 132.

At S130, ECU 100 calculates the charging efficiency based on intake air amount Q and engine speed NE. At S140, ECU 100 calculates basic injection amount TAU_B (μsec) based on the charging efficiency.

At S150, ECU 100 determines whether the F/C flag is reset or not. When the F/C flag is reset (YES at S150), control proceeds to 160, otherwise (NO at S150), control returns to S110.

At S160, ECU 100 calculates asynchronous injection requested amount TAU_REQ (μsec) based on the emission request. This is the amount of fuel required to achieve a rich atmosphere for first and second three-way catalytic converters 120A and 120B to sufficiently exhibit the $NO_x$ purifying function.

At S170, ECU 100 calculates upper limit guard injection amount ASY_MAX (μsec) based on basic injection amount TAU_B (μsec). Upper limit guard injection amount ASY_MAX (μsec) is calculated using a function f representing the relationship as shown in FIG. 2, for example.

At S190, ECU 100 determines whether asynchronous injection requested amount TAU_REQ (μsec) is higher than upper limit guard injection amount ASY_MAX (μsec). When asynchronous injection requested amount TAU_REQ (μsec) is higher than upper limit guard injection amount ASY_MAX (μsec) (YES at S180), control proceeds to S190, otherwise (NO at S180), control proceeds to S200.

At S190, ECU 100 inserts upper limit guard injection amount ASY_MAX (μsec) into asynchronous injection amount TAU_ASY (μsec). At S200, ECU 100 inserts asynchronous injection requested amount TAU_REQ (μsec) into asynchronous injection amount TAU_ASY (μsec).

At S210, ECU 100 outputs an asynchronous injection instruction signal (injection amount TAU_ASY) to injector 126.

An operation of ECU 100 realizing the fuel injection control device of the present embodiment based on the configuration and flow chart set forth above will be described hereinafter with reference to FIG. 4.

<During Fuel Cut>

When the operation of engine 150 is initiated and the fuel cut condition is satisfied, the F/C flag is set and fuel cut is initiated (YES at S100). This corresponds to time t(1) in FIG. 4.

Although fuel injection will not be actually executed during fuel cut, basic injection amount TAU_B (μsec) from injector 126 is calculated. Specifically, intake air amount Q to engine 150 is sensed (S110); engine speed NE is sensed (S120); the charging efficiency is calculated based on intake air amount Q and engine speed NE (S130); and basic injection amount TAU_B (μsec) is calculated based on the charging efficiency (S140).

Such an operation is repeated during fuel cut. This corresponds to the state from time t(1) onward, in FIG. 4, and basic injection amount TAU_B (μsec) is indicated by the dotted line.

When the fuel cut condition is no longer satisfied (or when the fuel cut restore condition is satisfied), the F/C flag is reset for restoration from a fuel cut mode (YES at S150). This corresponds to time t(2) of FIG. 4.

At time t(2), asynchronous injection requested amount TAU_REQ (μsec) is calculated based on emission request (S160). Then, upper limit guard injection amount ASY_MAX (μsec) is calculated based on basic injection amount TAU_B (μsec) and the relation shown in FIG. 2 (S170).

<When Regulated by Upper Limit Guard Injection Amount ASY_MAX>

When asynchronous injection requested amount TAU_REQ (μsec) at the time of restoration from fuel cut is high and larger than upper limit guard injection amount ASY_MAX (μsec) (YES at S180), upper limit guard injection amount ASY_MAX (μsec) is inserted into asynchronous injection amount TAU_ASY (μsec) (S190).

This is the state indicated by (A) in FIG. 4, and corresponds to the case where asynchronous injection requested amount TAU_REQ (μsec) is regulated by upper limit guard injection amount ASY_MAX (μsec) to be reduced to the level of upper limit guard injection amount ASY_MAX (μsec).

By the reduction down to upper limit guard injection amount ASY_MAX (μsec), the possibility of the catalyst being melted and deteriorated by backfire in the case where the fuel of asynchronous injection requested amount TAU_REQ (μsec) is provided by asynchronous injection can be avoided. Since at least upper limit guard injection amount ASY_MAX (μsec) is provided in asynchronous injection at the time of restoration from fuel cut, the atmosphere of first and second three-way catalytic converters 120A and 120B can be rendered rich, allowing improvement of the $NO_x$ purifying function.

<When Not Regulated by Upper Limit Guard Injection Amount ASY_MAX>

When asynchronous injection requested amount TAU_REQ (μsec) at the time of restoration from fuel cut is not large and is equal to or below upper limit guard injection amount ASY_MAX (μsec) (NO at S180), asynchronous injection requested amount TAU_REQ (μsec) is inserted into asynchronous injection amount TAU_ASY (μsec) (S200).

This state corresponds to (B) in FIG. 4. Asynchronous injection requested amount TAU_REQ (μsec) is not regulated by upper limit guard injection amount ASY_MAX (μsec), and only asynchronous injection requested amount TAU_REQ (μsec) is injected in an asynchronous manner at the time of restoration from fuel cut.

Even in such a case where only the fuel of asynchronous injection requested amount TAU_REQ (μsec) is injected asynchronously, the region where the charging efficiency is high and the emission request is satisfied can be achieved, so that the atmosphere of first and second three-way catalytic converters 120A and 120B can be rendered rich sufficiently. Therefore, the $NO_x$ purifying function can be improved.

By virtue of the fuel injection control device for an internal combustion engine according to the present embodiment set forth above, asynchronous injection based on emission request can be conducted while avoiding the problem of backfire and the like and also improving the $NO_x$ purifying function of the three-way catalytic converter at the time of restoration from fuel cut.

The problem such as backfire is particularly significant by asynchronous injection based on emission request at the time of restoration from fuel cut, subsequent to racing in an idling state of the engine prior to fuel cut. Therefore, the present invention is particularly advantageous when the asynchronous injection control of the present embodiment is effected after idle racing.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A fuel injection control device for an internal combustion engine, executing fuel cut that suppresses fuel supply to the internal combustion engine when a vehicle state satisfies a predetermined condition, comprising:
    means for controlling said internal combustion engine such that asynchronous injection is executed when execution of said fuel cut is ceased,
    setting means for setting an upper limit value of a fuel injection amount in a mode of said asynchronous injection,
    means for calculating a requested amount of injection for asynchronous injection in order to improve a function of an exhaust purify device provided at said internal combustion engine, and
    means for regulating said fuel injection amount for asynchronous injection to said upper limit value when said requested amount of injection is larger than said upper limit value.

2. The fuel injection control device for an internal combustion engine according to claim 1, wherein said setting means includes means for setting said upper limit value based on a basic injection amount by synchronous injection.

3. The fuel injection control device for an internal combustion engine according to claim 2, wherein said setting means includes means for setting said upper limit value relatively higher in a region where said basic injection amount is large as compared to a region where said basic injection amount is small.

4. The fuel injection control device for an internal combustion engine according to claim 1, wherein said fuel cut is executed after racing.

5. A fuel injection control method for an internal combustion engine, executing fuel cut that suppresses fuel supply to the internal combustion engine when a vehicle state satisfies a predetermined condition, comprising the steps of:
    controlling said internal combustion engine such that asynchronous injection is executed when execution of said fuel cut is ceased,
    setting an upper limit value of a fuel injection amount in a mode of said asynchronous injection,
    calculating a requested amount of injection for asynchronous injection in order to improve a function of an exhaust purify device provided at said internal combustion engine, and
    regulating said fuel injection amount for asynchronous injection to said upper limit value when said requested amount of injection is larger than said upper limit value.

6. The fuel injection control method for an internal combustion engine according to claim 5, wherein said step of setting an upper limit value includes the step of setting said upper limit value based on a basic injection amount by synchronous injection.

7. The fuel injection control method for an internal combustion engine according to claim 6, wherein said step of setting an upper limit value includes the step of setting said upper limit value relatively higher in a region where said basic injection amount is large as compared to a region where said basic injection amount is small.

8. The fuel injection control method for an internal combustion engine according to claim 5, wherein said fuel cut is executed after racing.

9. A recording medium recorded with a program to realize the fuel injection control method for an internal combustion engine defined in claim 5 using an operation unit.

10. A recording medium recorded with a program to realize the fuel injection control method for an internal combustion engine defined in claim 6 using an operation unit.

11. A recording medium recorded with a program to realize the fuel injection control method for an internal combustion engine defined in claim 7 using an operation unit.

12. A recording medium recorded with a program to realize the fuel injection control method for an internal combustion engine defined in claim 8 using an operation unit.

13. A fuel injection control device for an internal combustion engine, executing fuel cut that suppresses fuel supply to the internal combustion engine when a vehicle state satisfies a predetermined condition, said fuel injection control device including an operation unit, said operation unit adapted to control said internal combustion engine such that asynchronous injection is executed when execution of said fuel cut is ceased, set an upper limit value of a fuel injection amount in a mode of said asynchronous injection, calculate a requested amount of injection for asynchronous injection in order to improve a function of an exhaust purify device provided at said internal combustion engine, and regulate said fuel injection amount for asynchronous injection to said upper limit value when said requested amount of injection is larger than said upper limit value.

14. The fuel injection control device for an internal combustion engine according to claim 13, wherein said operation unit sets said upper limit value based on a basic injection amount by synchronous injection.

15. The fuel injection control device for an internal combustion engine according to claim 14, wherein said operation unit sets said upper limit value relatively higher in a region where said basic injection amount is large as compared to a region where said basic injection amount is small.

16. The fuel injection control device for an internal combustion engine according to claim 13, wherein said fuel cut is executed after racing.

* * * * *